United States Patent
Siedlik et al.

(10) Patent No.: US 12,536,856 B1
(45) Date of Patent: Jan. 27, 2026

(54) PHYSICAL SECURITY SYSTEM AND METHOD TO TEMPORARILY REVOKE A PORTION OF ACCESS CONTROL CREDENTIALS DURING AN INCIDENT

(71) Applicants: MOTOROLA SOLUTIONS, INC., Chicago, IL (US); Karolina Syrek-Kaplita

(72) Inventors: Jakub Siedlik, Tarnow (PL); Grzegorz Kaplita, Rzeszow (PL); Mariusz Wawrowski, Wawrzenczyce (PL); Piotr Chorzepa, Cracow (PL); Szymon Sikora, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 56 days.

(21) Appl. No.: 18/780,597

(22) Filed: Jul. 23, 2024

(51) Int. Cl.
  *G07C 9/28* (2020.01)
  *H04L 9/40* (2022.01)

(52) U.S. Cl.
  CPC .............. *G07C 9/28* (2020.01); *H04L 63/107* (2013.01); *G07C 2209/08* (2013.01)

(58) Field of Classification Search
  CPC ...... G07C 9/28; G07C 2209/08; H04L 63/107
  USPC ........................................................ 340/5.28
  See application file for complete search history.

(56) References Cited

U.S. PATENT DOCUMENTS

| | | | |
|---|---|---|---|
| 7,380,279 B2 | 5/2008 | Prokupets et al. | |
| 8,242,905 B2 | 8/2012 | Gerner et al. | |
| 9,286,790 B2 * | 3/2016 | Lyman | G09B 5/04 |
| 9,886,833 B2 * | 2/2018 | Noland | G08B 29/183 |
| 10,559,189 B1 * | 2/2020 | Menna | G08B 21/02 |
| 10,713,909 B2 | 7/2020 | Horgan et al. | |
| 11,125,537 B2 | 9/2021 | Riden | |
| 11,263,342 B2 | 3/2022 | Indukuri et al. | |
| 11,381,781 B2 | 7/2022 | Alcantara | |
| 11,469,789 B2 * | 10/2022 | Sharma | H04B 1/16 |
| 11,538,330 B2 * | 12/2022 | Raz | G01H 3/06 |

(Continued)

FOREIGN PATENT DOCUMENTS

| | | |
|---|---|---|
| IN | 202341076137 A | 12/2023 |
| WO | 2008051736 A2 | 5/2008 |

OTHER PUBLICATIONS

* National Protective Security Authority Publication—"Marauding Terrorist Attacks: Supplementary Guidance—Supplementary Guidance: Announcements", Edition 3, Mar. 2023, all pages.

(Continued)

*Primary Examiner* — Nam V Nguyen (57) ABSTRACT

A physical security system and method to temporarily revoke a portion of access control credentials during an incident is disclosed. The method includes determining a defined area with respect to which one or more protected assets therein have respective one or more asset securities potentially compromised due to one or more occurrences of respective one or more security-impacting access control events. The method also includes automatically and temporarily revoking a portion of access control rights possessed by at least some of a plurality of users registered with access control credentials for the physical access control system. The portion of the access control rights being temporarily revoked corresponds to physical entry rights via one or more access control points bordering or within the defined area.

20 Claims, 4 Drawing Sheets

FIG. 1

(56) References Cited

U.S. PATENT DOCUMENTS

| | | | |
|---|---|---|---|
| 12,118,791 B2* | 10/2024 | Polinski | B05B 1/02 |
| 12,335,661 B2* | 6/2025 | Jurzak | H04N 23/667 |
| 2008/0091681 A1 | 4/2008 | Dwivedi et al. | |
| 2009/0216587 A1 | 8/2009 | Dwivedi et al. | |
| 2015/0170486 A1* | 6/2015 | Penland | G07C 9/30 |
| | | | 348/152 |
| 2019/0266347 A1 | 8/2019 | Indukuri et al. | |
| 2022/0128683 A1* | 4/2022 | Sabripour | G06V 20/52 |
| 2023/0070772 A1* | 3/2023 | Bingham | G08B 19/005 |
| 2025/0254272 A1* | 8/2025 | Stawiszynski | H04N 7/183 |

OTHER PUBLICATIONS

• National Protective Security Authority Publication—"Marauding Terrorist Attacks: Supplementary Guidance—Physical Barriers to Delay and Discourage Attackers", Edition 2, Mar. 2023, all pages.

* cited by examiner

PHYSICAL SECURITY SYSTEM AND METHOD TO TEMPORARILY REVOKE A PORTION OF ACCESS CONTROL CREDENTIALS DURING AN INCIDENT

BACKGROUND

Security systems typically include, amongst other things, one or more video cameras and access control apparatus. Regarding access control apparatus, ensuring that only authorized individuals can access protected or secured areas may be crucially important. Protected or secured areas may be defined by physical doors (e.g., doors through which a human may enter) and walls, or they may also be virtually defined in other ways. For instance, a protected area may be defined as one in which unauthorized entry causes a detector to signal intrusion and optionally send a signal or sound an alarm either immediately or if authorization is not provided within a defined period of time.

Access control apparatus may limit entry into protected or secured areas of buildings, rooms within buildings, real property, fenced-in regions, or assets and resources therein, to only those individuals who have permission to enter. Thus, an access control system can be expected to identify the individual attempting to enter the secured area, and verify that the individual is currently authorized to enter.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help improve an understanding of embodiments of the present disclosure.

The system, apparatus, and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

In accordance with one example embodiment, there is provided a computer-implemented method carried out within a physical access control system. The computer-implemented method includes electronically detecting at least one occurrence of a respective at least one security-impacting access control event at a respective at least one specific location bordering or within a total area protected by the physical access control system. The computer-implemented method also includes determining, using an at least one processor, a defined area with respect to which one or more protected assets therein have respective one or more asset securities potentially compromised due to the at least one occurrence of the at least one security-impacting access control event, and the defined area being a subset of the total area. The computer-implemented method also includes automatically and temporarily revoking a portion of access control rights possessed by at least some of a plurality of users registered with access control credentials for the physical access control system (this occurs after the determining of the defined area). The portion of the access control rights being temporarily revoked corresponds to physical entry rights via one or more access control points bordering or within the defined area.

In accordance with another example embodiment, there is provided a physical access control system that includes at least one controller configured to electronically detect at least one occurrence of a respective at least one security-impacting access control event at a respective at least one specific location bordering or within a total area protected by the physical access control system. The physical access control system also includes at least one processor in communication with the at least one controller. The physical access control system also includes at least one electronic storage medium storing program instructions that when executed by the at least one processor cause the at least one processor to perform determining, using the at least one processor, a defined area with respect to which one or more protected assets therein have respective one or more asset securities potentially compromised due to the at least one occurrence of the at least one security-impacting access control event, and the defined area being a subset of the total area. The program instructions upon execution by the at least one processor also cause the at least one processor to perform automatically and temporarily revoking a portion of access control rights possessed by at least some of a plurality of users registered with access control credentials for the physical access control system (performed by the at least one processor following the determining of the defined area). The portion of the access control rights being temporarily revoked corresponds to physical entry rights via one or more access control points bordering or within the defined area.

Each of the above-mentioned embodiments will be discussed in more detail below, starting with example system and device architectures of the system in which the embodiments may be practiced, followed by an illustration of processing blocks for achieving an improved technical method, device, and system for temporarily revoking a portion of access control credentials during an incident.

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a special purpose and unique machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (SaaS), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Figure 1:
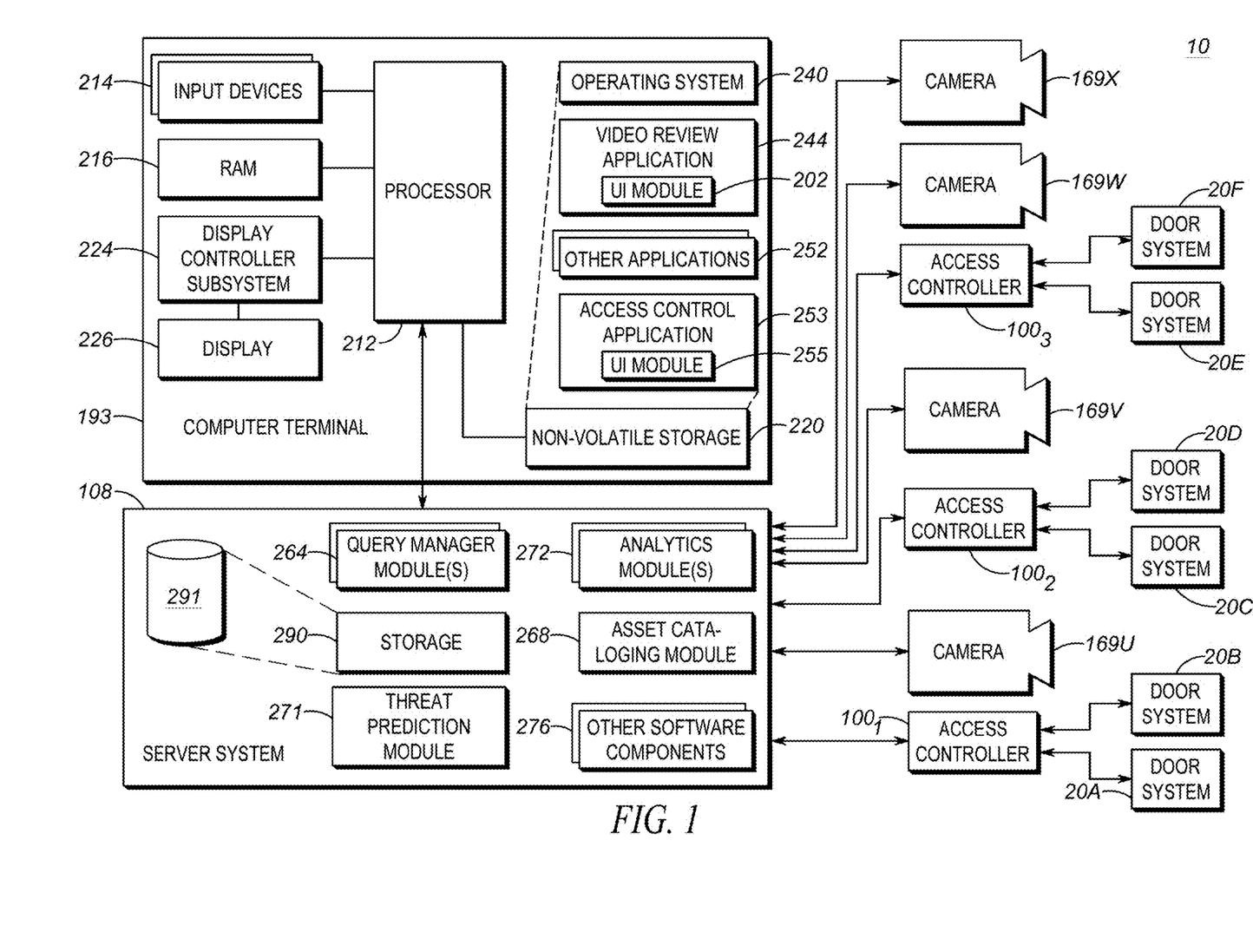
FIG. 1 is a block diagram of a security system according to an example embodiment.

Reference is now made to FIG. 1 which is a block diagram of an example security system 10 within which methods in accordance with example embodiments can be carried out. Included within the illustrated security system 10 are one or more computer terminals 193 and a server system 108. In some example embodiments, the computer terminal 193 is a personal computer system; however in other example embodiments the computer terminal 193 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. Furthermore, in some examples the server system 108 may be, in whole or in part, a cloud implementation. As will be appreciated by those skilled in the art, at least some of the functionality of the server system 108 can be implemented within the computer terminal 193 rather than within the server system 108.

The computer terminal 193 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 193 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 193 and the server system 108 are within the same Local Area Network (LAN).

The computer terminal 193 includes at least one processor 212 that controls the overall operation of the computer terminal. The processor 212 interacts with various subsystems such as, for example, input devices 214 (such as a selected one or more of a keyboard, mouse, touch pad, roller ball and voice control means, for example), random access memory (RAM) 216, non-volatile storage 220 and display controller subsystem 224. The display controller subsystem 224 interacts with display 226 and it renders graphics and/or text upon the display 226.

Still with reference to the computer terminal 193 of the security system 10, operating system 240 and various software applications used by the processor 212 are stored in the non-volatile storage 220. The non-volatile storage 220 is, for example, one or more hard disks, solid state drives, or some other suitable form of computer readable medium that retains recorded information after the computer terminal 193 is turned off. Regarding the operating system 240, this includes software that manages computer hardware and software resources of the computer terminal 193 and provides common services for computer programs. Also, those skilled in the art will appreciate that the operating system 240, video review application 244, the access control application 253, and other applications 252, or parts thereof, may be temporarily loaded into a volatile store such as the RAM 216. The processor 212, in addition to its operating system functions, can enable execution of the various software applications on the computer terminal 193.

Still with reference to FIG. 1, the video review application 244 can be run on the computer terminal 193 and includes a User Interface (UI) module 202 for cooperation with a search session manager module and other modules of the video review application 244 in order to enable a computer terminal user to carry out actions related to providing input such as, for example, input responsive to video alerts, and input to facilitate identifying same individuals or objects appearing in different video recordings. In such circumstances, the user of the computer terminal 193 is provided with a user interface generated on the display 226 through which the user inputs and receives information in relation to the video recordings.

The illustrated access control application 253 also includes a session manager module, which provides a communications interface between the UI module 255 and a query manager module (i.e. a respective one of illustrated one or more query manager modules 264) of the server system 108. In at least some examples, the search session manager module of the access control application 253 communicates with a respective one of the respective query manager module(s) 264 through the use of Remote Procedure Calls (RPCs).

Besides the query manager module(s) 264, the server system 108 includes several software components for carrying out other functions of the server system 108. For example, the server system 108 also includes an analytics module(s) 272. The analytics module(s) 272 may, in some examples, include a video analytics module for video analytics and computer vision functionality. In some examples the analytics module(s) 272 may also or alternatively include one or more of the following: i) an audio analytics module for audio analytics functionality; ii) a physical security analytics module for analyzing access control activity and/or motion sensor events; iii) a hybrid module (a hybrid of any the aforementioned modules). In some examples, the analytics module(s) 272 may also include one or more learning machines (such as, for instance, one or more convolutions neural networks). In some examples, some or all of the analytics module(s) 272 may be implemented outside of the server system 108 (for instance, implementation may be in one or more of the edge devices of the security system 10).

The server system 108 also includes a number of other software components 276. These other software components will vary depending on the requirements of the server system 108 within the overall system. As just one example, the other software components 276 might include special test and debugging software, or software to facilitate version updating of modules within the server system 108. The server system 108 also includes one or more data stores 290. In some examples, the data store 290 comprises database(s) 291.

Regarding the video cameras 169U-169X, although four video cameras are shown, any suitable number of video cameras is contemplated. Examples of suitable types of video camera include (but are not limited to) the following: box cameras, bullet cameras, Pan-Tilt-Zoom cameras, dome cameras, etc. Each of the video cameras 169U-169X may be selected, installed and calibrated based on desired operational capabilities to be possessed by the security system 10.

Still with reference to FIG. 1, illustrated door systems 20A-20F are communicatively linked to the server system 108 through respective access controllers $100_1$-$100_3$. Although six door systems are shown, any suitable number of door systems is contemplated. Similarly, although three access controllers are shown, any suitable number of access controllers is contemplated. Also, the one or more databases 291 can include a credential and policy directory (or alternatively the server system could include a separate storage, i.e. distinct from the storage 290, for the purpose of supporting the credential and policy directory). In FIG. 1, both access control modules and video security modules are provided on the same server system 108; however it also contemplated that the access control modules and the video security modules may be separately provided on different server systems. The access control system may be integrated with the video security system, but alternatively it also contemplated that the two systems might not be integrated and instead operate independently of each other.

As will be understood by those skilled in the art, each of the access controllers $100_1$-$100_3$ may log events, and the logs may be configured via an interface provided by a UI module 255 of access control application 253 to establish any number of devices, services, and systems as event recipients. Some or all of the access controllers $100_1$-$100_3$ may be configured to send the events to a remote monitoring service in any number of formats including, for example, SNMP, XML via direct socket connection (GSM, LAN, WAN, WiFi™), Syslog, and through a serial port. Also, the threat prediction module 271 and/or one of the analytics modules 272 may be configured to receive these events and/or data derived from these events.

Figure 2:
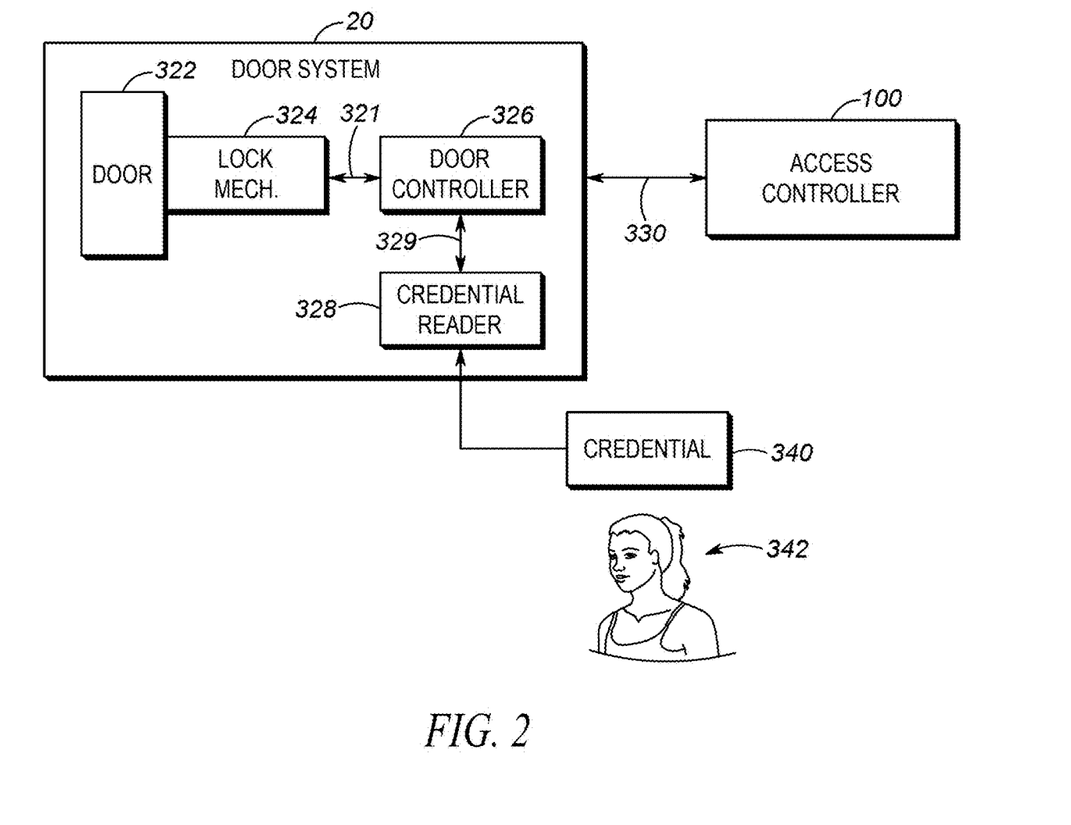
FIG. 2 is another block diagram providing additional detail in relation to the security system of FIG. 1.

Reference is now made to FIG. 2 which shows a block diagram of individual examples of each of the access controllers $100_1$-$100_3$ and the door systems 20A-20F in more detail than that provided in FIG. 1. In FIG. 2, the door system 20 is shown in communication with the access controller 100 over signal path 330. The door system 20 includes access door 322, door locking mechanism 324, door controller 326, and credential reader 328. The door 322 may be any door that allows individuals to enter or leave an associated enclosed area. The door 322 may include a position sensor (for example, a limit switch, which is not shown) that indicates when the door 322 is not fully closed. The position sensor may send a not-fully-closed signal over the signal path 321 to the door controller 326. The not-fully-closed signal may be sent continuously or periodically, and may or may not be sent until after a predefined time has expired.

With respect to the illustrated door system 20, the locking mechanism 324 includes a remotely operated electro-mechanical locking element (not shown) such as a dead bolt that is positioned (locked or unlocked) in response to an electrical signal sent over the signal path 321 from the door controller 326.

The door controller 326 receives credential information over a signal path 329 from the credential reader 328 and passes the information to the access controller 100 over another signal path 330. The door controller 326 receives lock/unlock signals from the access controller 100 over the signal path 330. The door controller 326 sends lock mechanism lock/unlock signals over the signal path 321 to the locking mechanism 324.

The credential reader 328 receives credential information 340 for an individual 342. The credential information 340 may be encoded in an RFID chip, a credential on a smart card, a PIN/password input using a key pad, and biometric data such as fingerprint and retina scan data, for example.

The door system 20 operates based on access request signals sent to the access controller 100 and access authorization signals received, in response, from the access controller 100. The door system 20 may incorporate an auto lock feature that activates (locks) the door 322 within a specified time after the door 322 is opened and then shut, after an unlock signal has been sent to the locking mechanism 324 but the door 322 not opened within a specified time, or under other conditions. The auto lock logic may be implemented in the door controller 326 or the locking mechanism 324.

The door system 20 may send event signals to the computer terminal 193 by way of the access controller 100 and the server system 108. Example of such signals include door open, door closed, locking mechanism locked, and locking mechanism unlocked. As noted above, the signals may originate from limit switches in the door system 20.

It is contemplated that a single door system 20 may be used for both entry and egress. Alternatively, it is also contemplated that one of the door systems 20A-20F may be used only for entry and a separate one of the door systems 20A-20F may be used only for egress.

However configured, the door systems may trigger the event that indicates when an individual 342 enters an enclosed area and when the individual 342 has exited that enclosed area, based on information obtained by reading credential information 340 of the individual 342 on entry and exit, respectively. These signals may be used to prevent reentry without an intervening exit, for example. The presence or absence of these signals also may be used to prevent access to areas and systems within the enclosed area. For example, the individual 342 may not be allowed to log onto his computer in the respective enclosed area in the absence of an entry signal originating from one of the door systems 20 of the respective enclosed area. Thus, the access controller 100 and its implemented security functions may be a first step in a cascading series of access operations to which the individual may be exposed. Also, in some examples access control rights may include abilities to access all or portions of computer systems, documents and/or software.

The door systems 20A-20F may incorporate various alarms, such as for a propped open door 322, a stuck unlocked locking mechanism 324, and other indications of breach or fault. Notification of alarms may appear within the UI module 255 of the access control application 253. The threat prediction module 271 and/or one of the analytics modules 272 may be configured to receive these events and/or data derived from these events.

Figure 3:
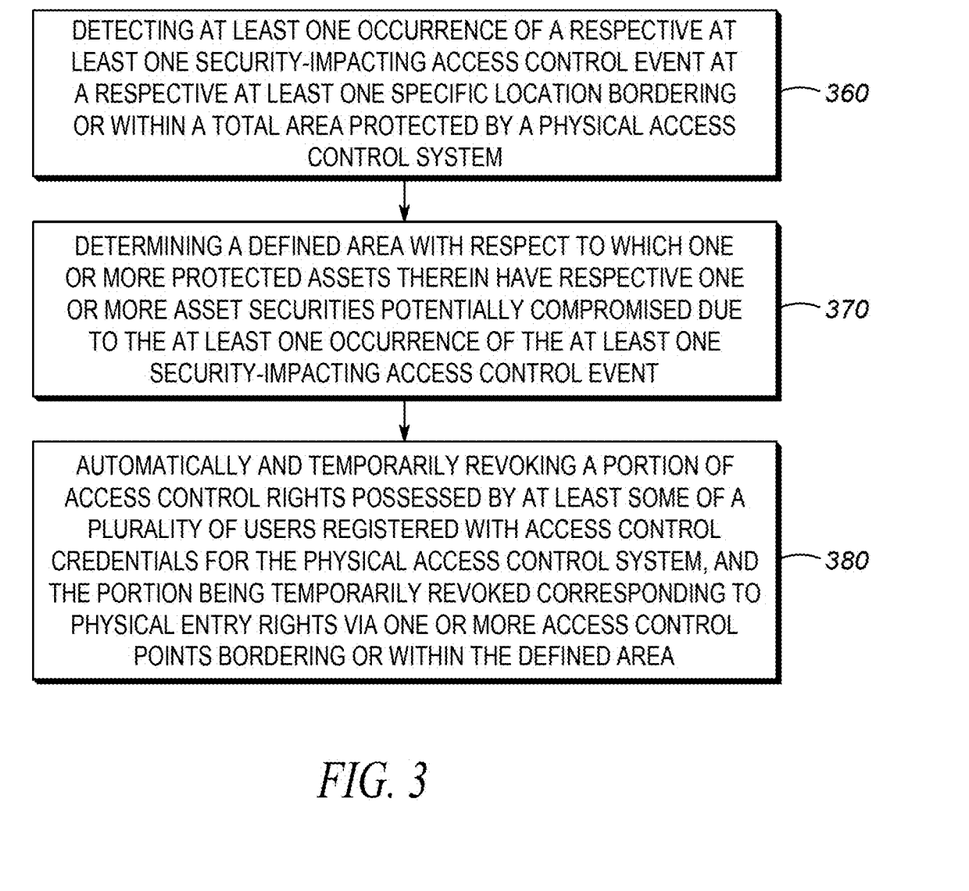
FIG. 3 is a flow chart illustrating a computer-implemented method in accordance with an example embodiment.

Reference is now made to FIG. 3. FIG. 3 is a flow chart illustrating a method 350 in accordance with an example embodiment. (Reference is also made below to FIG. 4, which is a diagram of a floor 400 in a building that may be protected by a security system in accordance with example embodiments.)

Firstly in the method 350, at least one occurrence of a respective at least one security-impacting access control event is detected (360) at a respective at least one specific location bordering or within a total area protected by the physical access control system. Examples of security-impacting access control events include a camera-tampering event, a forced door open event, and a tailgating event. Other types of security-impacting access control events, whether or not previously herein mentioned explicitly, are also contemplated.

Figure 4:
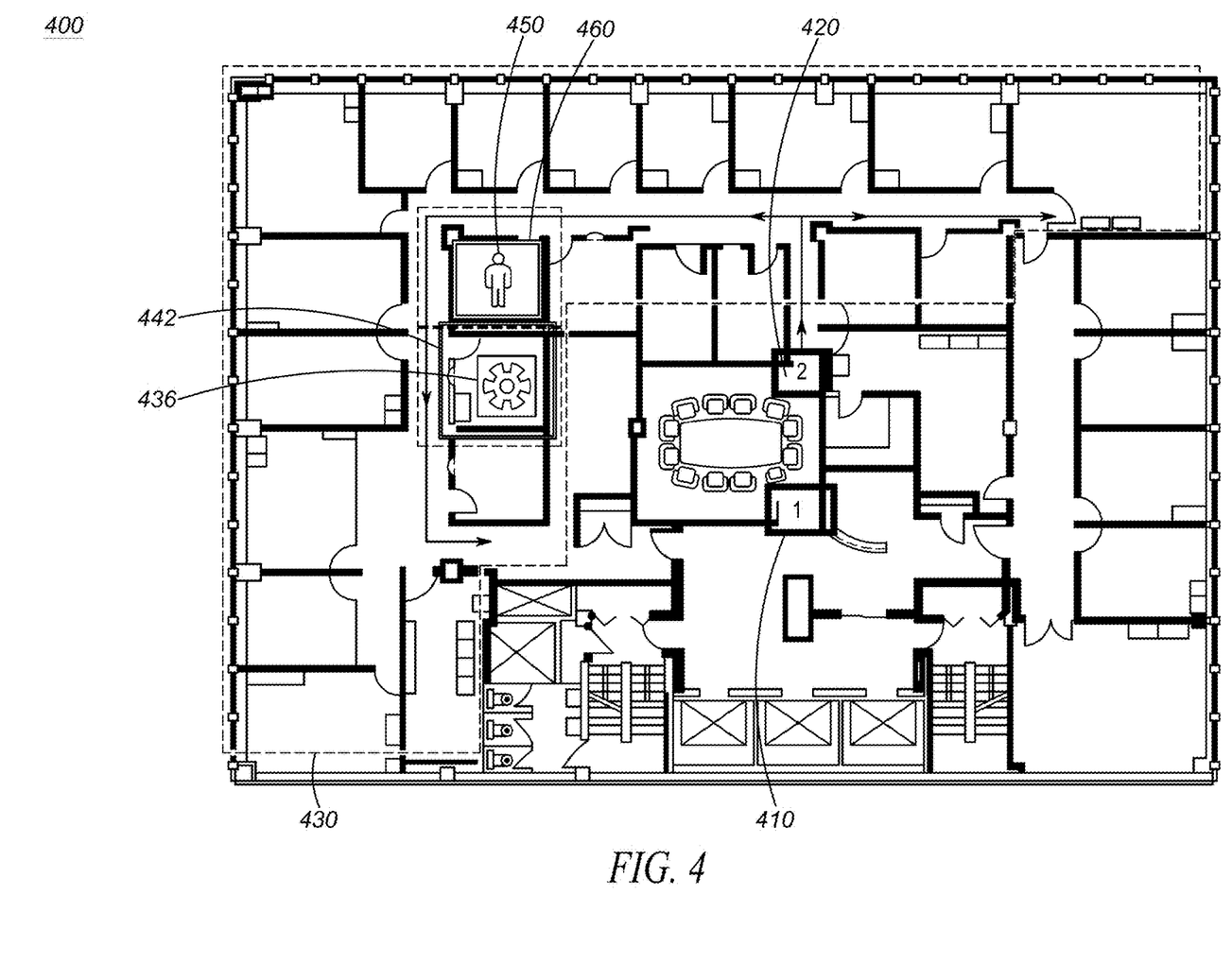
FIG. 4 is a diagram of an example floor in a building that may be protected by the security system of FIG. 1.

In FIG. 4 two security-impacting access control events are illustrated as being detected on the floor 400. One of the two events is a door 410 being detected as being forcefully opened at a first point in time. The other of the two events is a door 420 being detected as being forcefully opened at a second (later) point in time. These events and times are provided as input to, for instance, the threat prediction module 271 (FIG. 1) which determines that there is a direction of movement associated with these two events (i.e. movement upwardly towards the top illustrated part of the floor 400). Also, it will be understood that, in the illustrated example of FIG. 4, a first of the occurrences (of security-impacting access control events) is at a first location (i.e. location of the door 410), and a second of the occurrences is at a second location (i.e. location of the door 420), and the first and second locations are different specific locations on the floor 400.

Next in the method 350, action 370 is determining a defined area with respect to which one or more protected assets therein have respective one or more asset securities potentially compromised due to the at least one occurrence of the at least one security-impacting access control event. The defined area is a subset of the total area.

For example, in FIG. 4 the defined area (subset of a total area of the floor 400) is defined area 430 shown in dashed lines. The defined area 430 may be determined by, for instance, the threat prediction module 271 based on (and consistent with) the previously explained direction of movement of the security-impacting access control events. For instance, a movement vector may, in at least one example, be employed in the determining of the defined area 430, and the movement vector may be defined at least in part by: i) timestamps of the first and second event occurrences; and ii) the first and second locations of the first and second event occurrences.

Also, it will be appreciated that the defined area 430 need not necessarily remain static after being initially defined. In at least one example, the threat prediction module 271 may dynamically update dimensions of the defined area 430 in response to an additional occurrence detection of a respective additional security-impacting access control event at a respective additional specific location bordering or within the total area protected by the security system 10.

Also, it will be noted that, in the illustrated example, the one or more asset securities potentially compromised includes secret prototype machine 436 in room 442. That being said, it will of course be understood that other types of assets besides prototype machines are also contemplated. The server system 108 (FIG. 1) includes an asset cataloging module 268 to manage and catalog locations of sensitive assets like the secret prototype machine 436.

Next in the method 350, and following the determining of the defined area, action 380 occurs. The action 380 is revoking, automatically and temporarily, a portion of access control rights possessed by at least some of a plurality of users registered with access control credentials for the physical access control system. The portion of the access control rights being temporarily revoked corresponds to physical entry rights via one or more access control points bordering or within the defined area.

For example, in FIG. 4 a person 450, recorded as present in room 460, is determined to be close to the room 442 where the secret prototype machine 436 is located. In response to this determination, automatic and temporary revoking of access control rights of the person 450 to the room 442 may occur. Thus, in the illustrated example, the portion of the access control rights being temporarily revoked is an authorization for physical entry via a door for passage into the room 442 within the defined area 430.

In some examples, the access control-registered users impacted by the automatic and temporary revoking is a subset of users that have been recorded as being present within the total area (for example, the total area of the floor 400) at respective times not earlier than a defined amount of time prior to an occurrence time corresponding to at least one occurrence of a respective at least one of the security-impacting access control events. In this way the action 380 is a target response based on the automated analysis of relevant access control information that has been stored within the security system 10.

As should be apparent from this detailed description above, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot electronically detect an occurrence of an access control event within a security system, among other features and functions set forth herein).

In the foregoing specification, specific embodiments have been described. However, one of ordinary skill in the art appreciates that various modifications and changes can be made without departing from the scope of the invention as set forth in the claims below. For instance, the threat prediction module 271 may, in at least one example, dynamically generate a plurality of priority protection scores for a respective plurality of partial areas of the defined area. Further in respect of such example(s), first and second generated scores of the plurality of different priority protection scores may correspond to first and second partial areas of the plurality of partial areas, and the first partial area, different than the second partial area, may corresponds to, for instance an at least one room or an expected zone where a security-breaching person might be present. In these examples, the first generated score may be higher than the second generated score (or vice versa). Alternatively, in a different example the first partial area (corresponding to the first generated score that is higher than the second generated score) may be defined by the threat prediction module 271 to be the closer in distance than the second partial area to some specific location or zone (such as, for instance, an at least one specific location of a security-impacting access control event or an expected zone where a security-breaching person might be present).

While doors are herein shown and described as one type of barrier at access control points, those skilled in the art will understand that other types of barriers are contemplated. Examples of other types of barriers include turnstiles, gates, etc.

Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. Unless the context of their usage unambiguously indicates otherwise, the articles "a," "an," and "the" should not be interpreted as meaning "one" or "only one." Rather these articles should be interpreted as meaning "at least one" or "one or more." Likewise, when the terms "the" or "said" are used to refer to a noun previously introduced by the indefinite article "a" or "an," "the" and "said" mean "at least one" or "one or more" unless the usage unambiguously indicates otherwise.

Also, it should be understood that the illustrated components, unless explicitly described to the contrary, may be combined or divided into separate software, firmware, and/or hardware. For example, instead of being located within and performed by a single electronic processor, logic and processing described herein may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in this description and in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through intermediate elements or devices via an electrical element, electrical signal or a mechanical element depending on the particular context.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method carried out within a physical access control system, the computer-implemented method comprising:
   electronically detecting at least one occurrence of a respective at least one security-impacting access control event at a respective at least one specific location bordering or within a total area protected by the physical access control system;
   determining, using an at least one processor, a defined area with respect to which one or more protected assets therein have respective one or more asset securities potentially compromised due to the at least one occurrence of the at least one security-impacting access control event, wherein the defined area is a subset of the total area; and
   following the determining of the defined area, automatically and temporarily revoking a portion of access control rights possessed by at least some of a plurality of users registered with access control credentials for the physical access control system, wherein the portion of the access control rights being temporarily revoked corresponds to physical entry rights via one or more access control points bordering or within the defined area.

2. The computer-implemented method of claim 1 wherein the at least one occurrence of the at least one security-impacting access control event is a plurality of occurrences of respective security-impacting access control events.

3. The computer-implemented method of claim 2 wherein the at least one specific location is a plurality of different specific locations, a first of the occurrences is at a first location of the different specific locations, and a second of the occurrences is at a second location of the different specific locations.

4. The computer-implemented method of claim 3 wherein a movement vector is employed in the determining of the defined area, and the movement vector being defined at least in part by: i) timestamps of the first and second occurrences; and ii) the first and second locations of the first and second occurrences.

5. The computer-implemented method of claim 1 wherein the at least some of the plurality of users is a subset of users that have been recorded as being present within the total area at respective times not earlier than a defined amount of time prior to an occurrence time corresponding to the at least one occurrence.

6. The computer-implemented method of claim 1 wherein the at least one security-impacting access control event is at least one of a camera-tampering event, a forced door open event, and a tailgating event.

7. The computer-implemented method of claim 1 wherein:
   the portion of the access control rights being temporarily revoked includes an authorization for physical entry via a door for passage into at least one room within the defined area, and
   at least one of the one or more protected assets is situated within the at least one room.

8. The computer-implemented method of claim 7 wherein the portion of the access control rights being temporarily revoked also includes abilities to access all or portions of at least one of computer systems, documents and software.

9. The computer-implemented method of claim 1 further comprising dynamically generating a plurality of priority protection scores for a respective plurality of partial areas of the defined area,
   wherein:
   first and second generated scores of the plurality of priority protection scores correspond to first and second partial areas of the plurality of partial areas,
   the first partial area is different than the second partial area, and
   the first generated score is higher than the second generated score.

10. The computer-implemented method of claim 1 further comprising dynamically updating dimensions of the defined area in response to electronically detecting an additional occurrence of a respective additional security-impacting access control event at a respective additional specific location bordering or within the total area protected by the physical access control system.

11. The computer-implemented method of claim 1 further comprising dynamically generating a plurality of priority protection scores for a respective plurality of partial areas of the defined area, wherein:
first and second generated scores of the plurality of priority protection scores correspond to first and second partial areas of the plurality of partial areas,
the first partial area is closer in distance to the at least one specific location than the second partial area, and
the first generated score is higher than the second generated score.

12. A physical access control system comprising:
at least one controller configured to electronically detect at least one occurrence of a respective at least one security-impacting access control event at a respective at least one specific location bordering or within a total area protected by the physical access control system;
at least one processor in communication with the at least one controller;
at least one electronic storage medium storing program instructions that when executed by the at least one processor cause the at least one processor to perform:
determining, using an at least one processor, a defined area with respect to which one or more protected assets therein have respective one or more asset securities potentially compromised due to the at least one occurrence of the at least one security-impacting access control event, wherein the defined area is a subset of the total area; and
following the determining of the defined area, automatically and temporarily revoking a portion of access control rights possessed by at least some of a plurality of users registered with access control credentials for the physical access control system, wherein the portion of the access control rights being temporarily revoked corresponds to physical entry rights via one or more access control points bordering or within the defined area.

13. The physical access control system of claim 12 wherein the at least one occurrence of the at least one security-impacting access control event is a plurality of occurrences of respective security-impacting access control events.

14. The physical access control system of claim 13 wherein the at least one specific location is a plurality of different specific locations, a first of the occurrences is at a first location of the different specific locations, and a second of the occurrences is at a second location of the different specific locations.

15. The physical access control system of claim 14 wherein a movement vector is employed in the determining of the defined area, and the movement vector being defined at least in part by: i) timestamps of the first and second occurrences; and ii) the first and second locations of the first and second occurrences.

16. The physical access control system of claim 12 wherein the at least some of the plurality of users is a subset of users that have been recorded as being present within the total area at respective times not earlier than a defined amount of time prior to an occurrence time corresponding to the at least one occurrence.

17. The physical access control system of claim 12 wherein the at least one security-impacting access control event is at least one of a camera-tampering event, a forced door open event, and a tailgating event.

18. The physical access control system of claim 12 wherein the portion of the access control rights being temporarily revoked includes an authorization for physical entry via a door for passage into at least one room within the defined area.

19. The physical access control system of claim 18 wherein at least one of the one or more protected assets is situated within the at least one room.

20. The physical access control system of claim 12 wherein the at least one processor is further caused to perform dynamically updating dimensions of the defined area in response to electronically detecting an additional occurrence of a respective additional security-impacting access control event at a respective additional specific location bordering or within the total area protected by the physical access control system.

* * * * *